United States Patent
Kintzing et al.

(10) Patent No.: US 7,146,691 B2
(45) Date of Patent: Dec. 12, 2006

(54) FABRIC RETAINING CLIP HAVING CRENATED-SERRATED JAW ASSEMBLY

(75) Inventors: William M. Kintzing, Boulder, CO (US); Christof M. Kintzing, Las Vegas, NV (US)

(73) Assignee: Owens Corning Fiberglas Technology, Inc., Summit, IL (US)

(*) Notice: Subject to any disclaimer, the term of this patent is extended or adjusted under 35 U.S.C. 154(b) by 164 days.

(21) Appl. No.: 10/328,963

(22) Filed: Dec. 24, 2002

(65) Prior Publication Data

US 2004/0117957 A1 Jun. 24, 2004

(51) Int. Cl.
- A44B 21/00 (2006.01)
- A41F 1/00 (2006.01)
- B42F 1/00 (2006.01)

(52) U.S. Cl. .......................... 24/545; 24/555; 24/556; 24/562; 24/72.5

(58) Field of Classification Search ............. 24/542, 24/543, 544, 545–547, 563, 555, 556, 562, 24/72.5; 160/32, 391, 327; 19/114; 52/222; 251/10; 181/295

See application file for complete search history.

(56) References Cited

U.S. PATENT DOCUMENTS

| | | | |
|---|---|---|---|
| 3,315,679 A * | 4/1967 | Sarracino | 24/543 |
| 3,797,076 A * | 3/1974 | Watkin | 24/562 |
| D235,127 S | 5/1975 | Grant | |
| 4,161,977 A | 7/1979 | Baslow | |
| 4,197,686 A | 4/1980 | Baslow | |
| 4,625,490 A | 12/1986 | Baslow | |
| 4,631,882 A | 12/1986 | Sease | |
| 4,635,410 A | 1/1987 | Chumbley | |
| 4,676,016 A | 6/1987 | Phillips et al. | |
| 4,731,960 A | 3/1988 | Sease | |
| 4,788,806 A | 12/1988 | Sease | |
| 4,805,330 A | 2/1989 | Bubernak | |
| 4,887,324 A * | 12/1989 | Cairns | 160/327 |
| 4,920,714 A | 5/1990 | Sease | |
| 4,991,268 A * | 2/1991 | Ho | 24/67.3 |
| 5,029,422 A | 7/1991 | Scherrer | |
| 5,117,598 A | 6/1992 | Livingston et al. | |
| 5,214,891 A | 6/1993 | Edlin | |
| 5,214,892 A | 6/1993 | Livingston et al. | |
| 5,261,206 A | 11/1993 | Mesnel et al. | |
| 5,448,863 A | 9/1995 | Zapf | |
| D376,754 S | 12/1996 | Livingston et al. | |
| 5,953,873 A | 9/1999 | Livingston et al. | |
| 5,970,669 A | 10/1999 | Livingston | |
| 6,015,025 A | 1/2000 | McGrath et al. | |
| 6,015,026 A | 1/2000 | McGrath | |
| 6,018,850 A | 2/2000 | Lorber | |
| 6,044,527 A * | 4/2000 | Ishida et al. | 24/543 |
| 6,098,743 A | 8/2000 | McGrath | |
| 6,192,643 B1 | 2/2001 | Zadok | |
| 6,283,247 B1 | 9/2001 | McGrath et al. | |
| 6,324,797 B1 | 12/2001 | Fago et al. | |

FOREIGN PATENT DOCUMENTS

FR 2699210 6/1994

(Continued)

*Primary Examiner*—Jack W. Lavinder
(74) *Attorney, Agent, or Firm*—Inger H. Eckert; Maria C. Gasaway

(57) ABSTRACT

A fabric-retaining structure includes: a body; and a fabric-gripping jaw arrangement coupled to the body. The jaw arrangement includes: a crenated jaw having crenated teeth and a serrated jaw having serrated teeth. The crenated jaw is arranged in opposition to the serrated jaw.

8 Claims, 4 Drawing Sheets

FOREIGN PATENT DOCUMENTS

| | | |
|---|---|---|
| FR | 2699211 | 6/1994 |
| GB | 2253222 | 9/1992 |
| WO | WO 99/23321 | 5/1999 |

\* cited by examiner

Serrate Leaf

Crenate Leaf

FABRIC RETAINING CLIP HAVING CRENATED-SERRATED JAW ASSEMBLY

BACKGROUND OF THE INVENTION

Fabric retaining clips, e.g., for use with fabric-covered wall/ceiling systems are generally known. Such clips can have a variety of body configurations and jaw assemblies.

Fabric is retained by such clips via the jaw assembly. Typically, such jaw assemblies include opposing jaws having a variety of teeth configurations. A tooth configuration usually involves teeth both of the opposing jaws.

Typically, a jaw assembly has one type of teeth configuration.

SUMMARY OF THE INVENTION

An embodiment of the invention provides a fabric-retaining structure that includes: a body; and a fabric-gripping jaw arrangement coupled to the body. Such a jaw arrangement includes: a crenated jaw having crenated teeth and a serrated jaw having serrated teeth. The crenated jaw is arranged in opposition to the serrated jaw.

Additional features and advantages of the invention will be more fully apparent from the following detailed description of example embodiments, the appended claims and the accompanying drawings.

DETAILED DESCRIPTION OF EXAMPLE EMBODIMENTS

Figure 6:
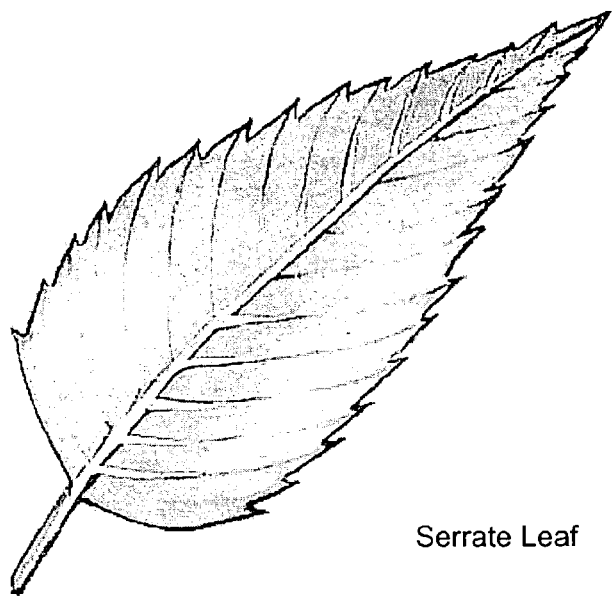
FIG. 6 is a drawing of a leaf that illustrates a serrated structure.
Figure 7:
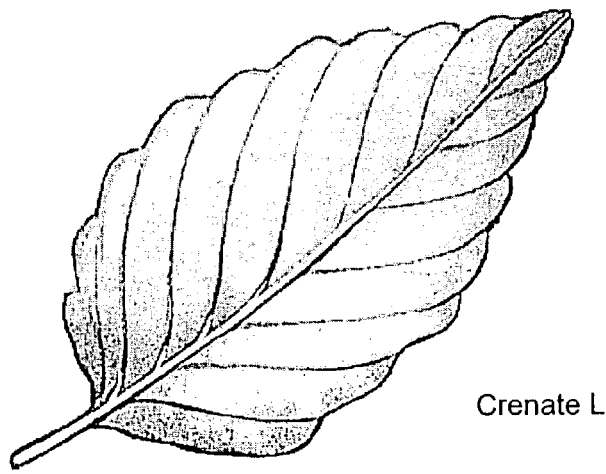
FIG. 7 is a drawing of a leaf that illustrates a crenated structure.

Initially, some definitions will be provided to facilitate discussion of the crenated-serrated jaw assembly according to an embodiment of the invention. A serrated structure, such as the leaf depicted in FIG. 6, has a margin with small sharp projections resembling the teeth of a saw, i.e., a saw-tooth edge or an edge notched with tooth like projections such as a serrate leaf. A crenated structure, such as the leaf depicted in FIG. 7, is one that has a margin with low, rounded or scalloped projections such as a crenate leaf.

Figure 1:
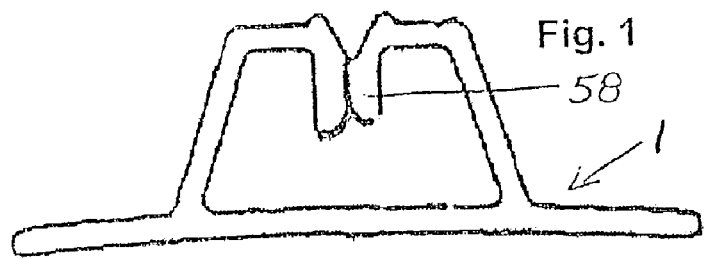
FIGS. 1–3 are cross-sectional views of retainer clip configurations that, when incorporating a crenated-serrated jaw assembly according to an embodiment of the invention, themselves represent embodiments of the invention.
Figure 2:
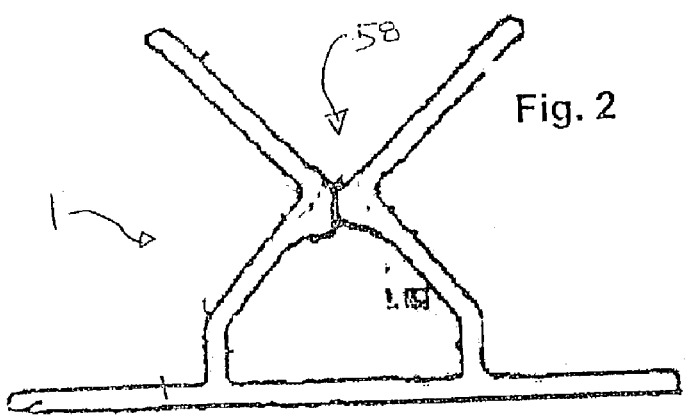
Figure 3:
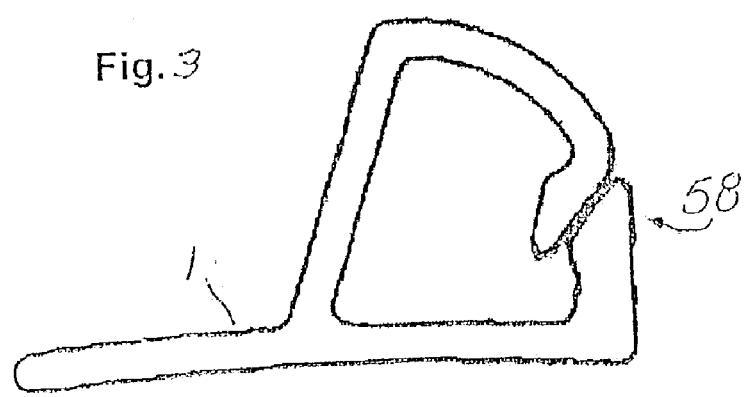
Figure 5:
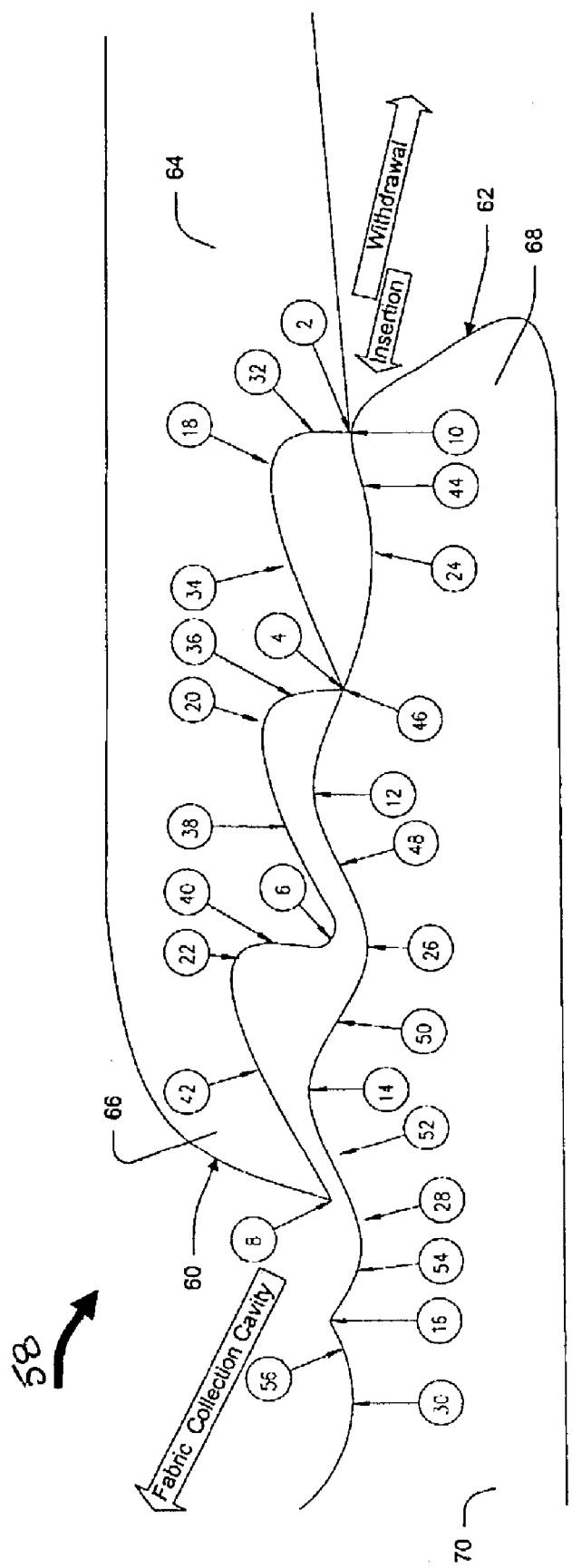
FIG. 5 is a cross sectional view of a crenated-serrated jaw assembly according to the an embodiment of the invention.

FIGS. 1–3 are cross-sectional views of retainer clip configurations that, when combined with a crenated-serrated jaw assembly according to an embodiment of the invention, e.g., such as in FIG. 5, each represent embodiments of the invention. FIGS. 1–3 emphasize examples of retainer clip bodies that are intended to incorporate a crenated-serrated jaw assembly according to an embodiment of the invention. As such, the jaw assemblies of FIGS. 1–3 have been depicted without teeth to simplify the drawings. FIGS. 1–3 are representative, myriad retainer clip configurations that are known in the art and are suitable for use with the crenated-serrated jaw assembly disclosed.

Figure 4:
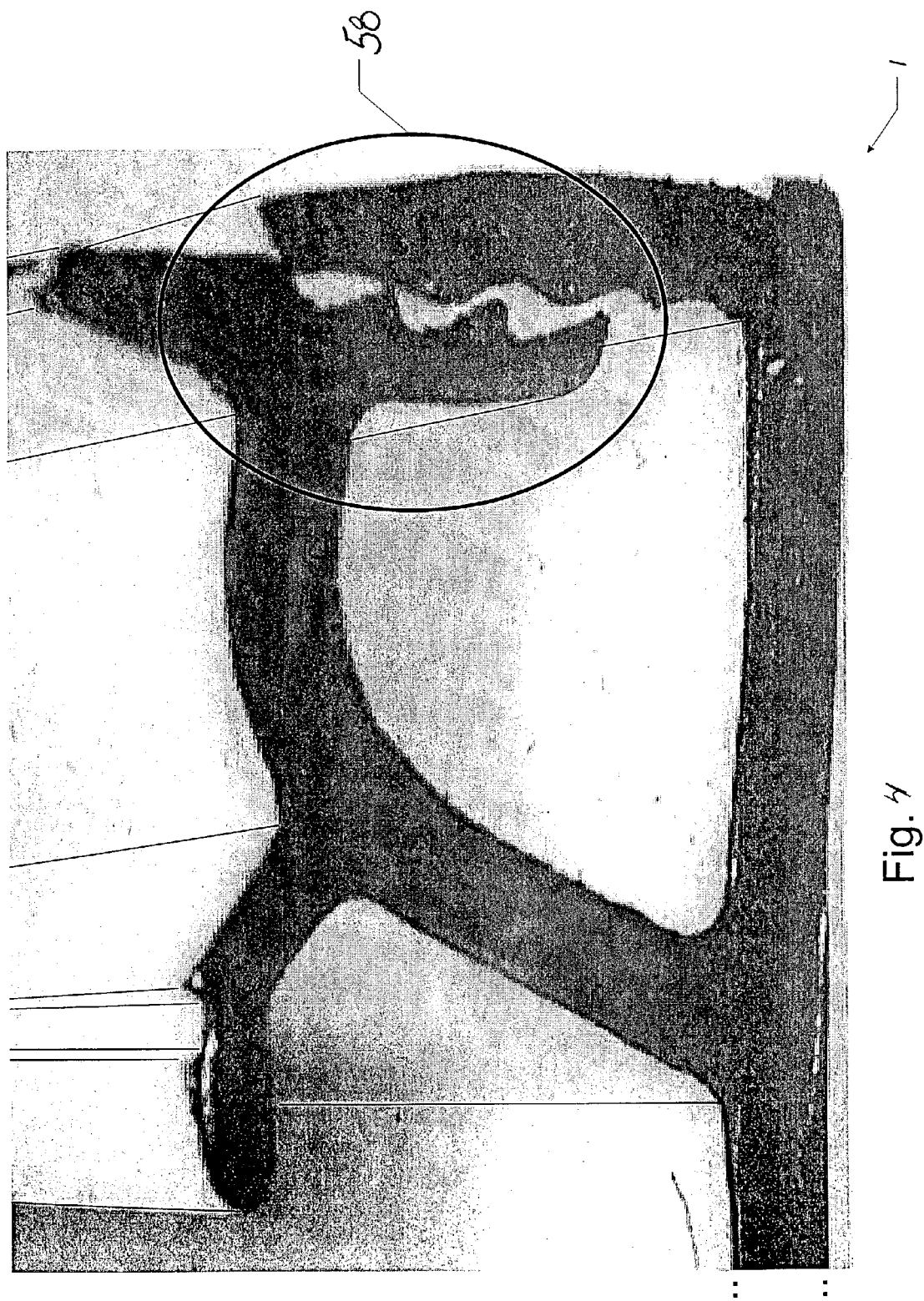
FIG. 4 is a perspective view of a retainer clip conformation according to an embodiment of the invention.

FIG. 4 is a perspective view of a retainer clip conformation 2000 according to an embodiment of the invention. FIG. 4 incorporates a crenated-serrated jaw assembly 58 according to an embodiment of the invention.

Retainer clips according to embodiments of the invention can be made of, any suitable material including a thermoplastic material, and may be manufactured using any suitable molding process. Such materials and processes are well known in the art and will not be discussed in more detail.

FIG. 5 is a cross sectional view of a crenated-serrated jaw assembly according to an embodiment of the invention. The jaw assembly 58 includes a serrated gripping section 60 and a crenated gripping section 62.

The serrated gripping section 60 includes pointed teeth 2, 4, 6 and 8. Sharply pointed tooth 2 has a side 32. Sharply pointed tooth 4 has sides 34 and 36. Blunt pointed tooth 6 has sides 38 and 40. Sharply pointed tooth 8 has a side 42.

Curved sections connect the respective sharp points. A curved section having a nadir 18 connects sides 32 and 34. A curved section having a nadir 20 connects sides 36 and 38. And a curved section having a nadir 22 connects sides 40 and 42.

The crenated gripping section 62 includes rounded teeth 10, 12 and 14, plus a sharply pointed tooth 16. Rounded tooth 10 has a side 44. Rounded tooth 12 has sides 46 and 48. Rounded tooth 14 has sides 50 and 52. Sharply pointed tooth 16 has sides 54 and 56.

Curved sections connect the rounded teeth. In particular, a curved section having a nadir 24 connects sides 44 and 46. A curved section having nadir 26 connects sides 48 and 50. And a curved section having nadir 28 connects 52 and 54.

In the example of FIG. 5, the crenated gripping section 62 is cantilevered and has a proximal end 70 (connected to supporting structure that is not depicted) and a distal (relative to the non-depicted supporting structure) end 68. The serrated gripping section 60 is also cantilevered and has a proximal end 64 (connected to supporting structure that is not depicted) and a distal (relative to the non-depicted supporting structure) end 66.

The proximal end 64 of the serrated gripping section 60 is located near the distal end 68 of the crenated gripping section 62, while the distal end 66 of the serrated gripping section 60 is located near the proximal end 70 of the crenated gripping section 62. Alternatively, the orientation of the serrated gripping section 60 can be reversed, i.e., the distal ends 66 and 68 can be adjacent and the proximal ends 64 and 70 can be adjacent. In the reversed case, the fabric-insertion tool blade 146 would be inserted from the left hand side of the figure as opposed to its current depiction (insertion from the right-hand side).

A fabric insertion tool (not depicted) is similar to a putty knife and is used to push fabric (not depicted) between the gripping sections 60 and 62 toward a fabric collection cavity (not depicted). The figure indicates that the fabric collection cavity is located nearer the ends 66 and 70. Also, the figure indicates the direction of insertion of the insertion tool as well as the direction of withdrawal of this tool.

The fabric retaining clips according to embodiments of the invention, namely fabric retaining clips that include crenated-serrated jaw assemblies according to embodiments of the invention, can be described as a combination of three types of teeth relationships: a substantially completely offset relationship, namely teeth 6 versus 12 & 14; a medium offset relationship, namely the pair of teeth 4 and 12; and a substantially zero offset relationship, namely the pair of teeth 2 and 10. This combination exhibits an advantage as the fabric insertion tool is withdrawn.

An embodiment of the invention represents the recognition of a problem in the Background Art. The insertion of an insertion tool into a Background Art retainer clip represents a wedge between the toothed gripping sections that spreads the gripping sections apart so that they cannot compress the fabric in between. This problem persists until the insertion tool is completely withdrawn. But before the insertion tool is withdrawn completely, some of the fabric can slip out of the fabric collection cavity, which can reduce the tension in the fabric being stretched between the retaining clips.

The combination of at least two, e.g., three, types of teeth configurations used in the crenated-serrated jaw assemblies according to embodiments of the invention permits some of the teeth (namely the substantially completely offset teeth 12, 6 and 14) to begin gripping the fabric before the insertion tool is completely withdrawn from between the substantially zero-offset pair of teeth 2 and 10. This helps reduce the loss of tension in the fabric that can otherwise occur as the insertion tool is withdrawn.

The invention may be embodied in other forms without departing from its spirit and essential characteristics. The described embodiments are to be considered only non-limiting examples of the invention. The scope of the invention is to be measured by the appended claims. All changes, which come within the meaning and equivalency of the claims, are to be embraced within their scope.

What is claimed is:

1. A fabric-retaining structure comprising:
    a body; and
    a fabric-gripping jaw arrangement coupled to the body,
    a crenated jaw having non-uniform, rounded teeth, wherein a distance between peaks of neighboring teeth in the crenated jaw is non-uniform;
    a serrated jaw having serrated teeth, the serrated jaw being arranged in opposition to the crenated jaw;
    wherein the jaw arrangement includes a substantially zero-offset teeth configuration, a medium offset teeth configuration and a plurality of substantially completely offset teeth configuration wherein, in an insertion direction from a mouth of the jaw arrangement towards a fabric collection cavity, said teeth configurations are encountered in the following order: first, the substantially zero-offset teeth configuration; second, the medium-offset teeth configuration; third, the substantially completely-offset teeth configuration; and fourth, the other substantially completely-offset teeth configuration.

2. A fabric-retaining structure comprising:
    a body; and
    a fabric-gripping jaw arrangement coupled to the body, the arrangement including
        a crenated jaw having non-uniform crenated teeth, wherein a distance between peaks of neighboring teeth in the crenated jaw is non-uniform; and
        a serrated jaw having serrated teeth, the serrated jaw being arranged in opposition to the crenated jaw;
        each of the crenated and serrated jaw having an end proximal to the body and an end distal to the body;
    the jaw arrangement having one of the following orientations:
        the distal ends of the jaws being located near to each other and the proximal ends of the jaws being located near to each other; and
        the distal end of the crenated jaw being located near the proximal end of the serrated jaw and the proximal end of the crenated jaw being located near the distal end of the serrated jaw wherein the jaw arrangement includes a substantially zero-offset teeth configuration, a medium offset teeth configuration and a plurality of substantially completely offset teeth configurations wherein, in an insertion direction from a mouth of the jaw arrangement towards a fabric collection cavity, said teeth configurations are encountered in the following order: first, the substantially zero-offset teeth configuration; second, the medium-offset teeth configuration; third, the substantially completely-offset teeth configuration; and fourth, the other substantially completely-offset teeth configuration.

3. The structure of claim 2, wherein the height of the rounded tooth at the distal end is smaller than the remaining rounded teeth.

4. The structure of claim 2, wherein a distance between peaks of neighboring teeth in the crenated jaw is non-uniform.

5. The structure of claim 2, wherein at least one of the teeth in the crenated jaw has a left portion and a right portion that are substantially symmetric.

6. A fabric-retaining device comprising:
    a base Structure; and
    pinching means, connected to the base structure, for pinching together fabric, the pinching means including
        crenated jaw means having non-uniform crenated teeth, wherein a distance between peaks of neighboring teeth in the crenated jaw is non-uniform; and
        serrated jaw means having serrated teeth, the serrated jaw means being configured to oppose the crenated jaw means;
        wherein the pinching means includes a substantially zero-offset teeth configuration, a medium offset teeth configuration and a plurality of substantially completely offset teeth configurations wherein, in an insertion direction from a mouth of the pinching means towards a fabric collection cavity, said teeth configurations are encountered in the following order: first, the substantially zero-offset teeth configuration; second, the medium-offset teeth configuration; third, the substantially completely-offset teeth configuration; and fourth, the other substantially completely-offset teeth configuration.

7. The structure of claim 6, wherein
    the crenated jaw means has an end proximal to the base structure and an end distal to the base structure;
    the crenated jaw means includes rounded teeth;
    the height of the rounded tooth at the distal end is smaller than the remaining rounded teeth.

8. The structure of claim 6, wherein at least one of the teeth in the crenated jaw has a left portion and a right portion that are substantially symmetric.

* * * * *